Figure 11:
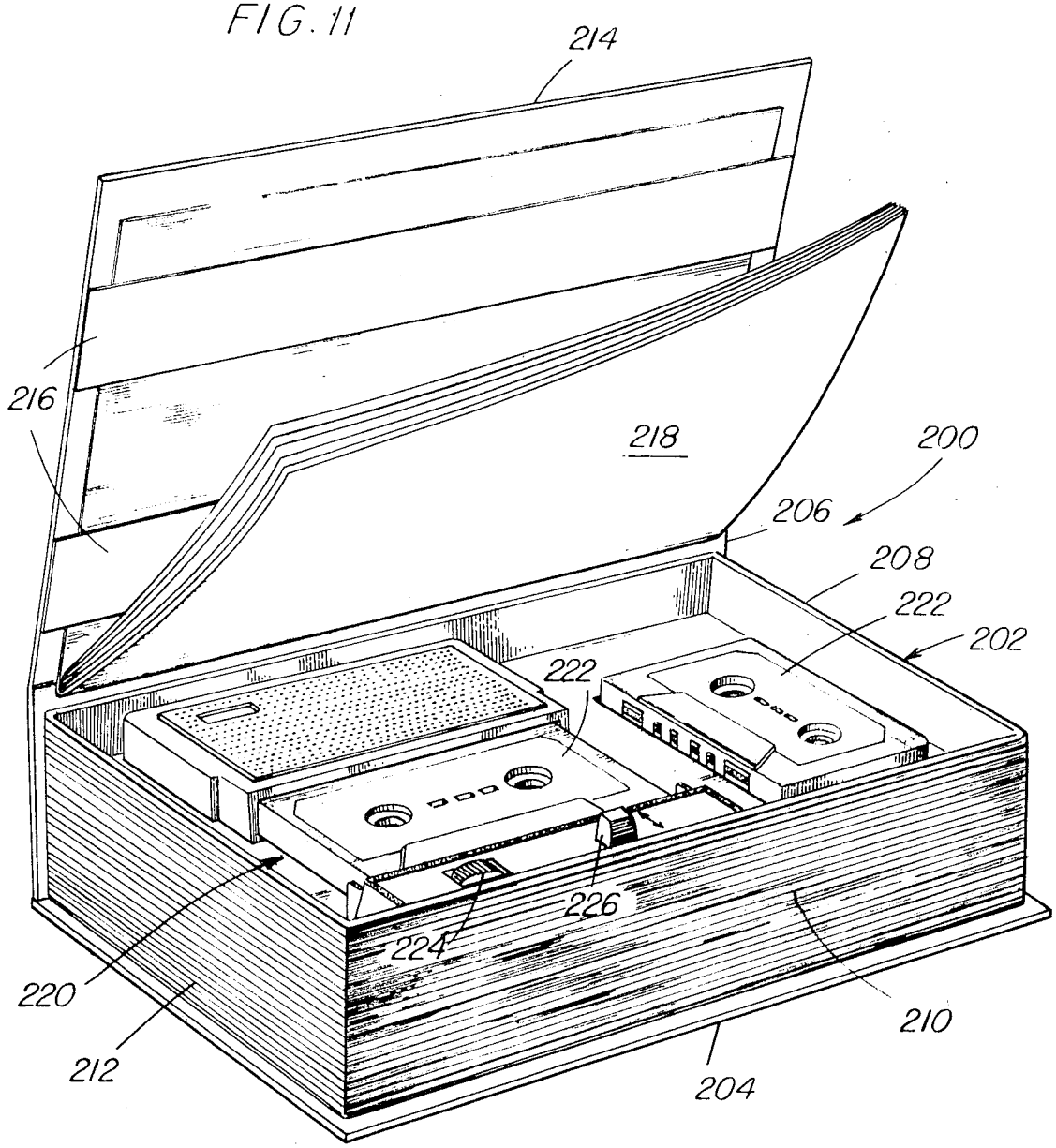

United States Patent

Paige

[15] 3,641,684
[45] Feb. 15, 1972

[54] TALKING BOOK

[72] Inventor: Richard E. Paige, 215 East 68th St., New York, N.Y. 10021

[22] Filed: Jan. 11, 1971

[21] Appl. No.: 105,529

Related U.S. Application Data

[63] Continuation-in-part of Ser. No. 811,148, Mar. 27, 1969, Pat. No. 3,553,851.

[52] U.S. Cl. .................................................35/8 A, 274/11 B
[51] Int. Cl. ......................................G09b 5/06, G11b 25/06
[58] Field of Search ...................................35/8 A; 274/11 B

[56] References Cited

UNITED STATES PATENTS

| 3,086,297 | 4/1963 | Kantrowitz | 35/35 C |
| 3,273,894 | 9/1966 | Clawson | 35/8 A X |
| 3,352,027 | 11/1967 | Schwartz | 35/8 A |
| 3,503,141 | 3/1970 | Schwartz | 35/8 A |
| 3,553,851 | 1/1971 | Paige | 35/8 A |

Primary Examiner—William H. Grieb
Attorney—Ryder, McAulay & Hefter

[57] ABSTRACT

A teaching device for simultaneously teaching the reading and pronouncing of words is described which includes the combination of a housing having the appearance of a book, a tape player within the housing, a replaceable prerecorded tape and a printed book detachably mounted on the housing, the material printed in the book corresponding to the material recorded on the tape.

7 Claims, 11 Drawing Figures

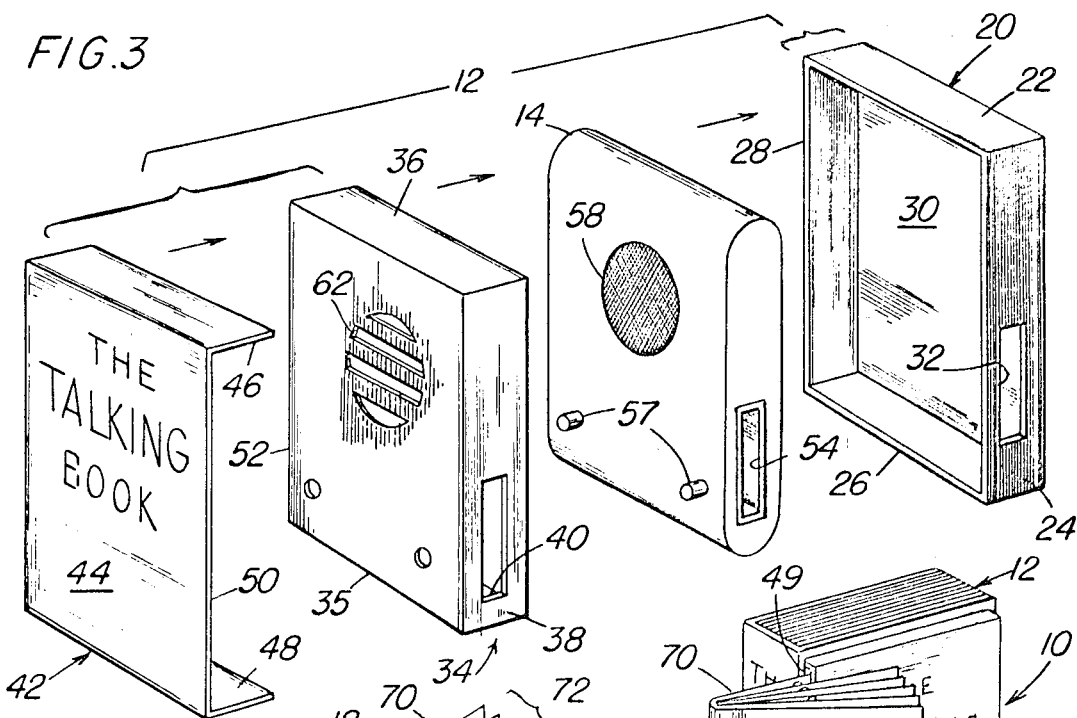
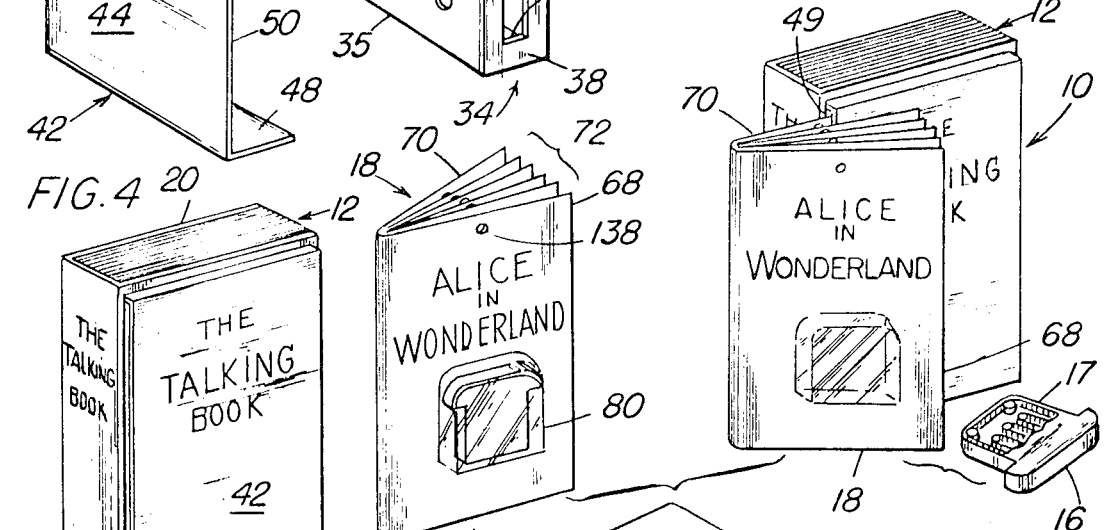
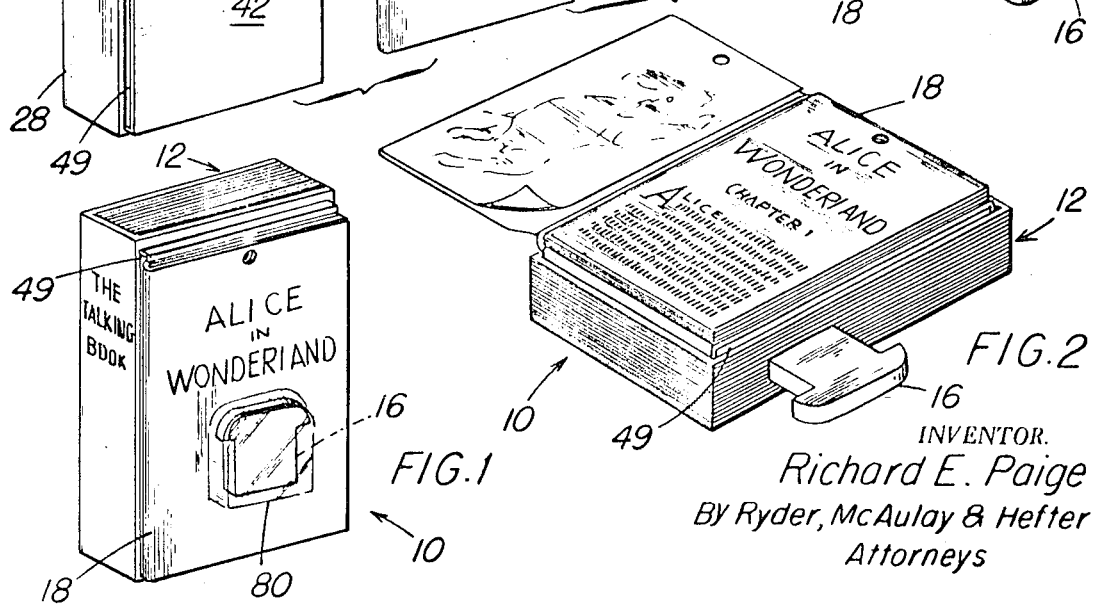

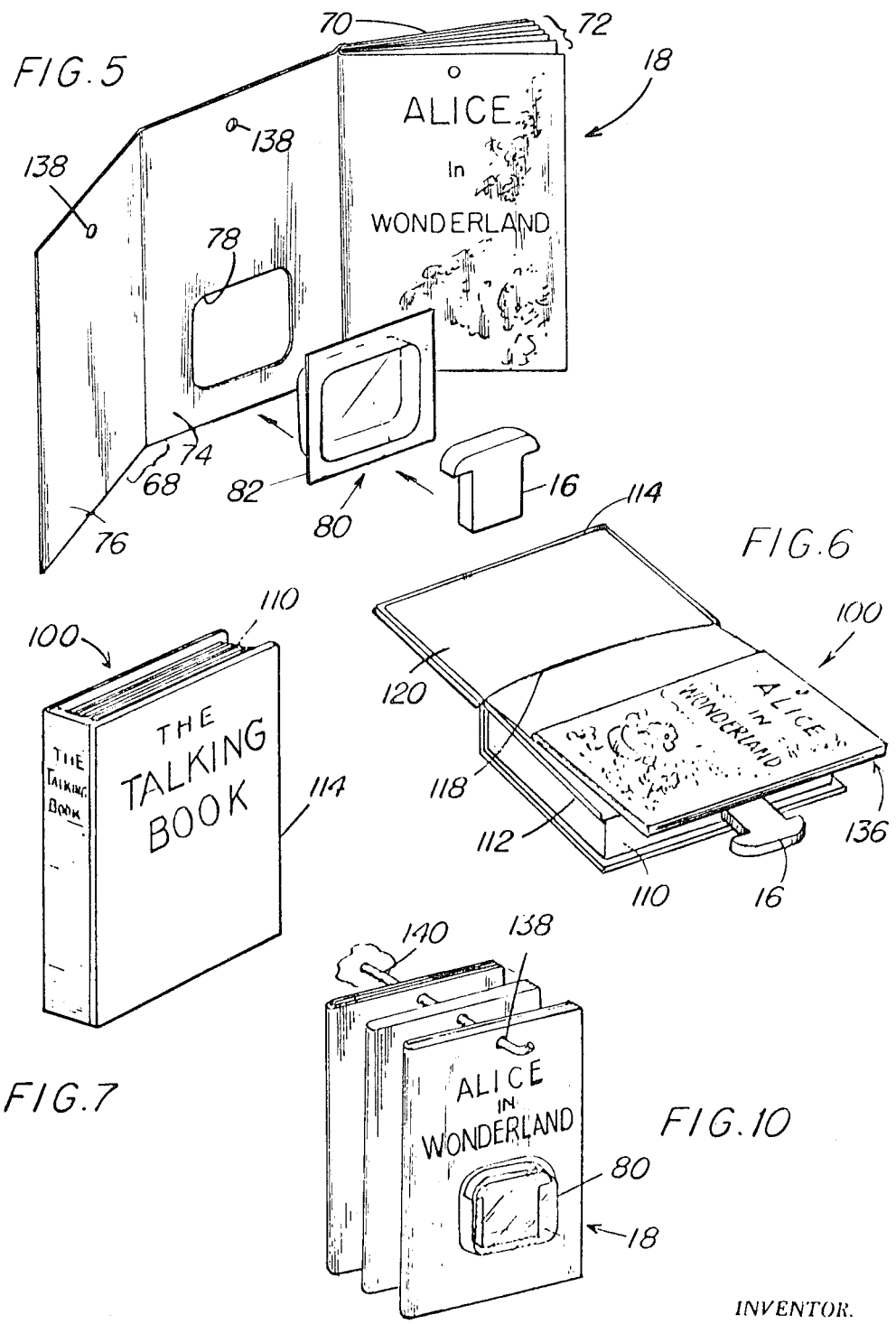

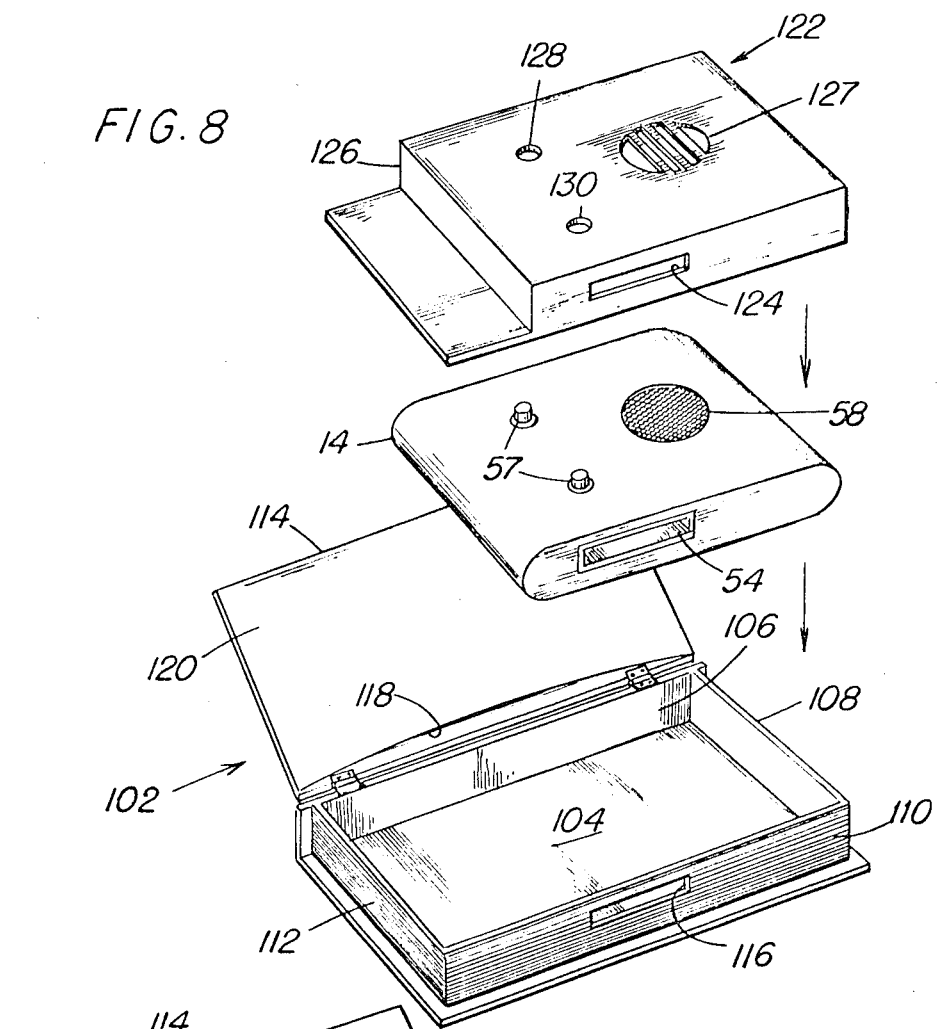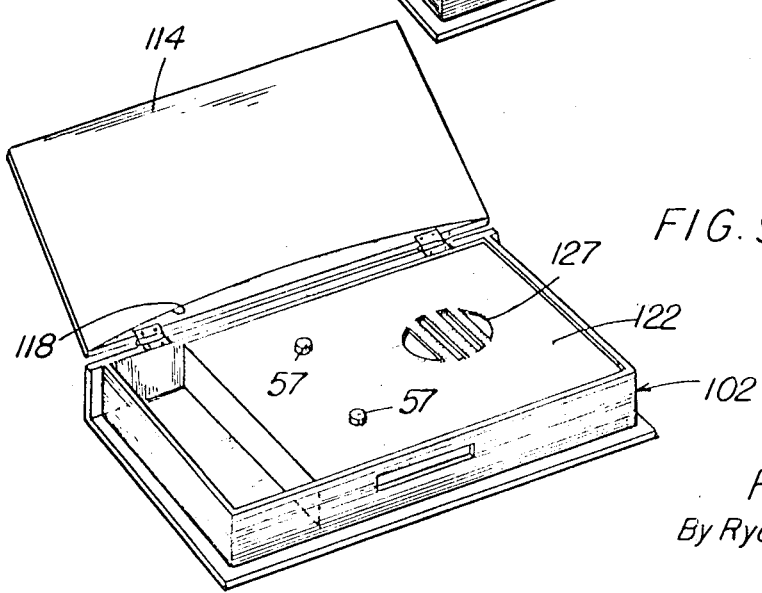

3,641,684

TALKING BOOK

This a continuation-in-part of patent application, Ser. No. 811,148 filed Mar. 27, 1969 now U.S. Pat. No. 3,553,851, issued Jan. 12, 1971.

BACKGROUND

This invention relates to teaching devices and, more particularly, to a teaching device for simultaneously teaching the reading and pronouncing of words.

It is well known that a language can be most easily learned and best learned by constant exposure to the language in its spoken form. The most obvious example of this is the ability of a child to learn his native tongue without any formal instruction. Similarly, reading can be learned effectively by looking at the words while they are being read to the student. This method of learning combines sight word recognition with phonetics and proper pronunciation. The method is suitable for use by adults learning a new language as well as by children.

Many devices have been designed in an attempt to utilize these concepts. One example is the combination of a phonograph, a record and a related book (see U.S. Pat. Nos. 3,086,297 and 3,273,894). Another example of such an attempt is a toylike device in the form of a book which includes a manually operable spring loaded talking device which is operated by pulling a string and, during the spring-operated rewind, a voice is heard speaking approximately one sentence for each pull of the string.

These and other related devices are either too bulky and inconvenient for easy portability, in contrast to the ease of portability of a book, or they are limited to a single text and are not designed for use with a plurality of replaceable texts and recordings. Also, the voice quality of many of these devices is poor and not ideal for teaching proper enunciation. In some devices, the player for recorded material is manually operated thus detracting from the users concentration and freedom to use his hands for other purposes such as taking notes and in addition to producing sound of inferior fidelity.

Accordingly, it is one object of this invention to provide a teaching device for the simultaneous teaching of reading and pronunciation, which device is easily portable and may be carried, held and used by a child like an ordinary book, which provides for interchangeability of recorded and printed textual material and which provides faithful and quality fidelity.

DESCRIPTION

Briefly stated, this invention, in one form, comprises a housing having a shape, size and appearance of a book, in which is mounted a magnetic tape player adapted to receive a cartridge or cassette having a prerecorded tape. The housing is provided with a pocket in the top wall thereof to receive one cover of a book; the book text corresponding to the matter recorded on the tape. One of the covers of the book may be provided with a container for housing the tape cartridge when on display or not being used.

The combination of the housing in the form of a book, the tape player, the prerecorded cartridge, and the book form an integral portable unit providing simultaneous corresponding printed and oral textual material serving as an excellent teaching device for word recognition as well as correct pronunciation.

The objectives and advantages of this talking book will be better appreciated and understood from the detailed description below and from the drawings in which:

FIG. 1 is a perspective view of a teaching device formed in accordance with a first embodiment of this invention, FIG. 2 is a perspective view of the teaching device of FIG. 1 shown open and in use, FIG. 3 is an exploded perspective view of a portion of the teaching device of FIG. 1, FIG. 4 includes perspective views of each of the components of the teaching device of FIG. 1, FIG. 5 is an exploded perspective view of a printed book and tape cartridge forming part of the teaching device of this invention, FIG. 6 is a perspective view of a teaching device formed in accordance with a second embodiment of this invention, FIG. 7 is a perspective view of the teaching device of FIG. 6 shown closed, FIG. 8 is an exploded perspective view of a portion of the teaching device formed in accordance with a second embodiment of this invention, FIG. 9 is a perspective view of the housing portion of the second embodiment, FIG. 10 is a perspective view of the printed book shown mounted on a sales display rack, FIG. 11 is a perspective view of a teaching device formed in accordance with a third embodiment of this invention.

FIRST EMBODIMENT (FIGS. 1–5)

Referring to the drawings, and more particularly FIGS. 1 through 4, there is illustrated a teaching device 10 formed in accordance with a first embodiment of this invention and having four basic elements, a housing 12, a tape playback apparatus 14, tape cartridge or cassette 16 enclosing a prerecorded tape 17 therein, and a book 18.

The housing 12 is formed of a bottom portion 20 having four sidewalls 22, 24, 26, 28 and a bottom wall 30. A slot 32 is provided through one of the sidewalls 24. Three sidewalls, for example walls 22, 24, 26 are decorated to look like edges of pages of a book and the fourth sidewall 28 is decorated to look like a book binding. The housing also includes a top portion 34 having a top wall 35, four sidewalls, only two of which, 36, 38, are illustrated in FIG. 3. One of the sidewalls 38 has a slot 40 therethrough, the slot 40 corresponding in size and location to the slot 32 through the sidewall 24 of the bottom portion 20. The housing further includes a U-shaped sleeve 42 having an outer wall 44 and at least two depending sidewalls 46, 48. The outer wall 44 of the sleeve 42 and the bottom wall 30 of the bottom portion 20 are decorated to look like the front and back covers of a book, respectively. Each of the elements forming the housing, that is the bottom portion 20, the top portion 34, and the sleeve 42 may be formed of molded plastic, wood, heavy paper board or other suitable material.

The three portions forming the housing 12 fit together in telescoping fashion as may be seen in FIG. 3. More specifically, the top portion 34 fits within the bottom portion 20 to lie substantially flush with the upper edge of the sidewalls of the bottom portion. The sleeve 42 slides between the sidewalls of the top portion and the sidewalls of the bottom portion, the sidewalls 46, 48 of the sleeve having a length sufficient to provide a slight clearance 49 between the inner surface 50 of the outer wall 44 and the outer surface 52 of the top wall 35. When the three portions are assembled to form the housing, the housing has the size, shape and appearance of a book (see FIG. 4).

An electrically operated magnetic tape player 14 resides within the housing 12 between the bottom portion 20 and top portion 34. The player 14 has a slot 54 corresponding in size and location to the slots 32 and 40 through the bottom portion 20 and top portion 34, respectively, of the housing 12. The tape player 14 is conventional and commercially available and is battery powered, although it can be adapted to include a cord for plug-in operation so that a battery can be conserved for times when an electricity source is not available. A "start" switch is located within the slot 54 and the player is actuated by insertion of a tape cartridge 16. The tape cartridge houses an endless tape 17 which has been prerecorded and is ready for playback. The material that is recorded on the tape corresponds to or, for some purposes, is identical to the textual material appearing in the book 18. Standard controls 57, such as volume and track selection for a multitrack system, are provided on the top of the tape player and are accessible through the top wall 35 of the top portion 34 of the housing. A speaker is mounted immediately below a speaker opening 58 in the top of the player. These locations for the controls and speaker are preferable; however, other locations, such as through a sidewall or bottom wall, are satisfactory also. Corresponding to the speaker opening 58 and aligned therewith is an aperture 62 extending through the top wall 35 of the top portion 34.

The printed book 18, best seen in FIGS. 4 and 5, includes a cover having a front page 68 and rear page 70 and a plurality of intermediate pages 72 on which are printed textual material corresponding to the textual material recorded on the tape 17. The front cover page 68 has a width extending from the binding line approximately twice that of the width of the rear cover page 70 so that the front cover page can be folded in half, forming a primary portion 74 and a secondary portion 76. An aperture 78 is provided through the primary portion 74 and a plastic transparent container 80 is inserted through the aperture 78. The container 80 is formed with outwardly extending flanges 82 on the inner edge of the sidewalls thereof which abut against the inside surface of the primary portion 74. The flanges 82 prevent the plastic container 80 from sliding through the aperture 78; however, to further insure against this contingency, the container can be bonded to the inside surface of the primary portion 74 by applying glue along the inside surface of the primary flanges 82. The aperture 78 and container 80 are of a size appropriate to house the tape cartridge 16. With the cartridge inserted through the aperture from the inside of the primary portion 74, the secondary portion 76 is folded to lie juxtaposed to the inside surface of the primary portion 74 thus closing the container 80 and providing a storage compartment for the cartridge.

When it is desired to use a particular book, the rear cover page 70 is inserted in the clearance 49 between the outer wall 44 of the sleeve 42 and the top wall 35 of the top portion 34 (see FIG. 4). The corresponding cartridge 16 is removed easily by merely moving the secondary portion 76 of the front cover page away from the primary portion 74 thus exposing the cartridge. In this manner the cartridge storage compartment can be reused as contrasted with conventional blister packs or other packaging methods wherein the enveloping material is broken in order to remove the contents. Furthermore, many different books and cartridges can be used with one playback apparatus because the books and cartridges are extremely easy to remove and replace.

SECOND EMBODIMENT (FIGS. 6–9)

The second embodiment of this invention, illustrated in FIGS. 6 through 9, is very similar to the first embodiment and includes the basic concept of providing a unique, integral teaching device which is self-contained, readily portable, and which provides the combination of simultaneous oral and visual instruction with the ability to vary the lessons easily at will. The primary difference between the first and second embodiment is in the construction of the housing of the device.

The teaching device 100 which forms the second embodiment comprises a housing 102 having a bottom wall 104, four sidewalls 106, 108, 110, 112 and a top wall 114 hingedly attached to one of the sidewalls 106. The bottom wall, sidewalls and top walls are suitably designed to give the appearance of a book and one of the sidewalls, namely wall 110, is provided with a slot 116 to receive a tape cartridge 16. A pocket 118 is formed on the inside surface of the top wall by either attaching a plastic, cloth or paper sheet 120 to the inside surface of the top wall 114 along three edges of the sheet or by attaching an envelope to the inside of the top wall 114.

The tape player 14, which is shorter than the housing 102, is placed within the housing and retained therein by a tight fitting enclosure 122 which fits over the player 14 and within the housing 102. The enclosure 122 is provided with a slot 124 corresponding in location to the slot 116 in the housing and the slot 54 in the tape player. The enclosure is formed with a stepped configuration providing a compartment 126 to receive a plurality of cartridges for storage, as is best seen in FIGS. 8 and 9. The enclosure 122 is provided with an aperture 127 corresponding in location to the speaker opening 58 of the player. The enclosure also is provided with apertures 128, 130 to receive control knobs 57 on the player 14 which, in the form illustrated in FIG. 6, are located on the top thereof.

The printed book 136 to be used with the second embodiment 100 may be identical to the book 18 described above. However, since the pocket 118 is on the inside of the top wall 114, the front cover page of the book is inserted in the pocket permitting the book to lie flat on the enclosure (see FIG. 6). The cartridge and plastic container are removed from the book cover when it is in use. The container may be stored in the compartment 126.

THIRD EMBODIMENT (FIG. 11)

A third embodiment of this invention, illustrated in FIG. 11 is similar to the first two embodiments discussed above. This embodiment provides a construction specifically designed for conventional tape cassettes while retaining the basic concept of a self-contained, portable, small teaching device which permits variation of the oral and visual matter with ease.

The teaching device 200 comprises a book sized and shaped housing 202 having a bottom wall 204, four sidewalls 206, 208, 210, 212 and a top wall 214 hingedly attached to one of the sidewalls 206. The bottom wall 204 and top wall 214 give the appearance of the back and front covers of a book. One sidewall 206 gives the appearance of a book binding and the remaining three sidewalls 208, 210, 212 are made to resemble book pages. A pocket may be formed on the inside surface of the top wall 214 to receive one of the covers of a book 218. The pocket can be formed as described above with respect to the second embodiment and shown in FIGS. 6 and 8. Alternatively, instead of a pocket one or more retaining strips 216 can be mounted on the inside of the top wall 214 and to receive a cover of the book 218.

A conventional battery operated cassette tape player 220 is mounted within the housing 202. The tape player 220 can be retained in the housing by many different means, such as by screws (not shown) through the bottom wall of the housing 202. The tape player preferably is shorter in length than the housing to provide room to store one or more tape cassettes 222. The tape player also should extend up from the bottom wall 204 a distance less than the height of the sidewalls 206, 208, 210, 212 to enable closing of the top wall 214 while a book 218 is retained thereon and also to permit storage of one or more books within the housing. The tape player has a conventional on-off and volume control 224 and a forward and reverse quick wind control 226. If desired a track selector to permit use of multiple track cartridges can be included. Access to the tape player 220 in order to change cassettes, adjust volume, wind or rewind the tape and select channels is obtained by opening the top of the housing 202 as can be seen in FIG. 11. The ability to easily and quickly reverse the tape direction and control the degree of rewind is particularly favorable for the teaching device of this invention since it permits the user to replay a portion of the lesson that he may be finding troublesome.

The printed book 218 used with the teaching device 200 can be identical to the book 136 described above with respect to the second embodiment.

As can be seen from the drawings and the above discussion this invention provides a teaching device in the form of a book which contains a tape player for providing oral instruction and a book for providing visual instruction, with the visual and oral instruction corresponding to one another. The teaching device is inexpensive, easy to operate, convenient to use and is readily portable which makes it highly conducive for use by both children and adults, particularly for study purposes but which may also serve as an enjoyable diversion, such as story telling.

Commercially, the detachable story or lesson books make possible an endless library of subjects to be sold and used in conjunction with one tape-playing book. As illustrated in FIG.

10, by providing a hole 138 through the top of the book, a number of books can be displayed on a rack 140 for sales purposes.

While only one printed book design has been described it is envisioned that other designs may be used. For example, the cartridge or cassette container 80 can be located in the rear cover page so that when used with the teaching device 100 illustrated in FIG. 8, the container is received in the compartment 126 without the need for removing it from the printed book. Furthermore, the printed book and tape cartridge need not be packaged as a single unit and the cover of the printed book need not include a container.

I claim:

1. A teaching device for simultaneously teaching the reading and pronouncing of words, comprising, in combination, a housing having the appearance of a book, the housing including a bottom wall having the appearance of a back cover of a book, three sidewalls having the appearance of edges of book pages, a fourth sidewall having the appearance of a binding and a top wall having the appearance of a front cover of a book and being hingedly attached to one of the sidewalls, retaining means on this top wall, a magnetic tape player within the housing, the player being adapted to receive a tape cassette, a tape cassette having a prerecorded tape, a printed book including front and rear cover pages, the printed book being detachably mounted on the housing by insertion of one of the cover pages in the retaining means, the printed book containing text corresponding to the matter recorded on the tape, the combination of the housing, player, cassette and printed book forming an integral, portable unit providing simultaneous, corresponding written and oral textual material.

2. The device of claim 1 wherein the tape player includes a cassette receiving receptacle on a side thereof facing the top wall whereby the tape player is accessible for inserting and removing cassettes therefrom by opening the housing through movement of the top wall.

3. The device of claim 2 wherein the tape player includes control means which are accessible when the top wall of the housing is moved.

4. The device of claim 1 wherein the printed book includes a container for storing, displaying and protecting the tape cassette.

5. The device of claim 4 wherein one of the covers of the printed book includes a primary portion and a secondary portion, the primary portion being hingedly attached to the other of the covers and the secondary portion being hingedly attached to a free edge of the primary portion and lying contiguous to the inside surface of the primary portion, the primary portion having an aperture therethrough and a container projecting outwardly from the primary portion, the aperture and container having a size approximately the same as the cassette, the container and secondary portion in combination providing a storage compartment for the cassette.

6. A device as defined in claim 1 where the player has a length less than the length of the housing providing for the formation of a compartment for storage of cassettes.

7. A device as defined in claim 1 wherein the player has a height less than the height of the sidewalls to provide storage space for printed books.

* * * * *